(12) United States Patent
Assigno

(10) Patent No.: US 10,919,427 B1
(45) Date of Patent: Feb. 16, 2021

(54) CAR FLOOR MAT COVER

(71) Applicant: Koffi Assigno, New Carrolton, MD (US)

(72) Inventor: Koffi Assigno, New Carrolton, MD (US)

( * ) Notice: Subject to any disclaimer, the term of this patent is extended or adjusted under 35 U.S.C. 154(b) by 33 days.

(21) Appl. No.: 16/023,249

(22) Filed: Jun. 29, 2018

(51) Int. Cl.
*B60N 3/04* (2006.01)

(52) U.S. Cl.
CPC .............. *B60N 3/046* (2013.01); *B60N 3/048* (2013.01)

(58) Field of Classification Search
CPC ................................ B60N 3/046; B60N 3/048
USPC ....................................................... 296/97.23
See application file for complete search history.

(56) References Cited

U.S. PATENT DOCUMENTS

| | | | | |
|---|---|---|---|---|
| 3,337,258 A | * | 8/1967 | Steinberg | ................. B60N 3/04 296/97.23 |
| 4,804,570 A | * | 2/1989 | Bedics | .................... A47L 23/24 15/217 |
| 5,725,926 A | | 3/1998 | Wang | |
| 6,224,962 B1 | * | 5/2001 | Young, III | ......... B62D 25/2072 296/97.23 |
| 7,416,771 B2 | * | 8/2008 | Bailey | .................... B60N 3/046 15/215 |
| 8,919,054 B2 | * | 12/2014 | Tillery | .................... E04F 15/22 52/177 |
| 9,051,739 B2 | * | 6/2015 | Rosan | ..................... E01C 9/086 |
| 9,333,890 B2 | * | 5/2016 | Garbarino | .............. B60N 3/046 |
| 2016/0229323 A1 | * | 8/2016 | Veik | ........................ B60N 3/046 |
| 2016/0304018 A1 | | 10/2016 | Chowdhury | |
| 2018/0229637 A1 | * | 8/2018 | Parra Becerra | ........ B60N 3/044 |

* cited by examiner

*Primary Examiner* — Pinel E Romain
(74) *Attorney, Agent, or Firm* — Sanchelima & Associates, P.A.; Christian Sanchelima; Jesus Sanchelima

(57) ABSTRACT

The present invention is a modular cover for covering car floor mat. Many times, the passengers boarding the vehicles associated with a shared cab service do not take enough precautions to clean their footwear before entering the vehicle. Due to this the car floor mat is subjected to the onslaught of dirt, snow, soft drink spills, and the like, thereby rendering the car floor mat or rug dirty. To overcome this issue, the present invention envisages a modular cover for car floor mats, which is designed to cover the entire surface area of the car floor mat. One embodiment of the car floor mat cover includes a pair of mat sections that are connectable via a connector section. The mat sections and the connector section are interconnected by means of complementary engagement formations formed thereon.

7 Claims, 4 Drawing Sheets

CAR FLOOR MAT COVER

BACKGROUND OF THE INVENTION

1. Field of the Invention

The present disclosure relates to a car floor mat cover. More particularly, the present disclosure relates to a modular cover for covering the entire surface of the floor mat in one section of a car.

2. Description of the Related Art

The cars that are associated with shared cab services tend to be subjected to a lot of rough usage. For example, the passengers do not take enough precautions to sufficiently clean their footwear before entering the vehicle. This is not desired and tends to spoil the car floor mat. Hence there is need for a car floor mat cover that overcomes the aforementioned drawback.

Several designs for car floor mats have been designed in the past. None of them, however, have been designed to cover the complete surface of an existing car floor mat.

Applicant believes that a related reference corresponds to U.S. Pat. No. 5,725,926 filed by Ming-Ling Wang for a car floor mat. The Ming reference discloses a car floor mat has a dustproof side and a waterproof side. However, the floor mat disclosed in the Ming reference fails to disclose a cover for the floor mat and instead provides a construction of floor mat to have dustproof and waterproof sides.

Another related application is US patent publication no. 20160304018 filed by Nayemul Chowdhury for a vehicle mat. The Nayemul reference discloses a vehicle having at least one removable carpet vehicle mat. However, the Nayemul reference fails to disclose a modular cover for a car floor mat that covers the entire surface of the car floor mat.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a car floor mat cover for protecting the car floor mat from the onslaught of soft drink spills, dirt, snow, and the like.

It is still another object of the present invention to provide a car floor mat cover that has a modular configuration.

It is yet another object of the present invention to provide a car floor mat cover that covers the entire surface of the car floor mat.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
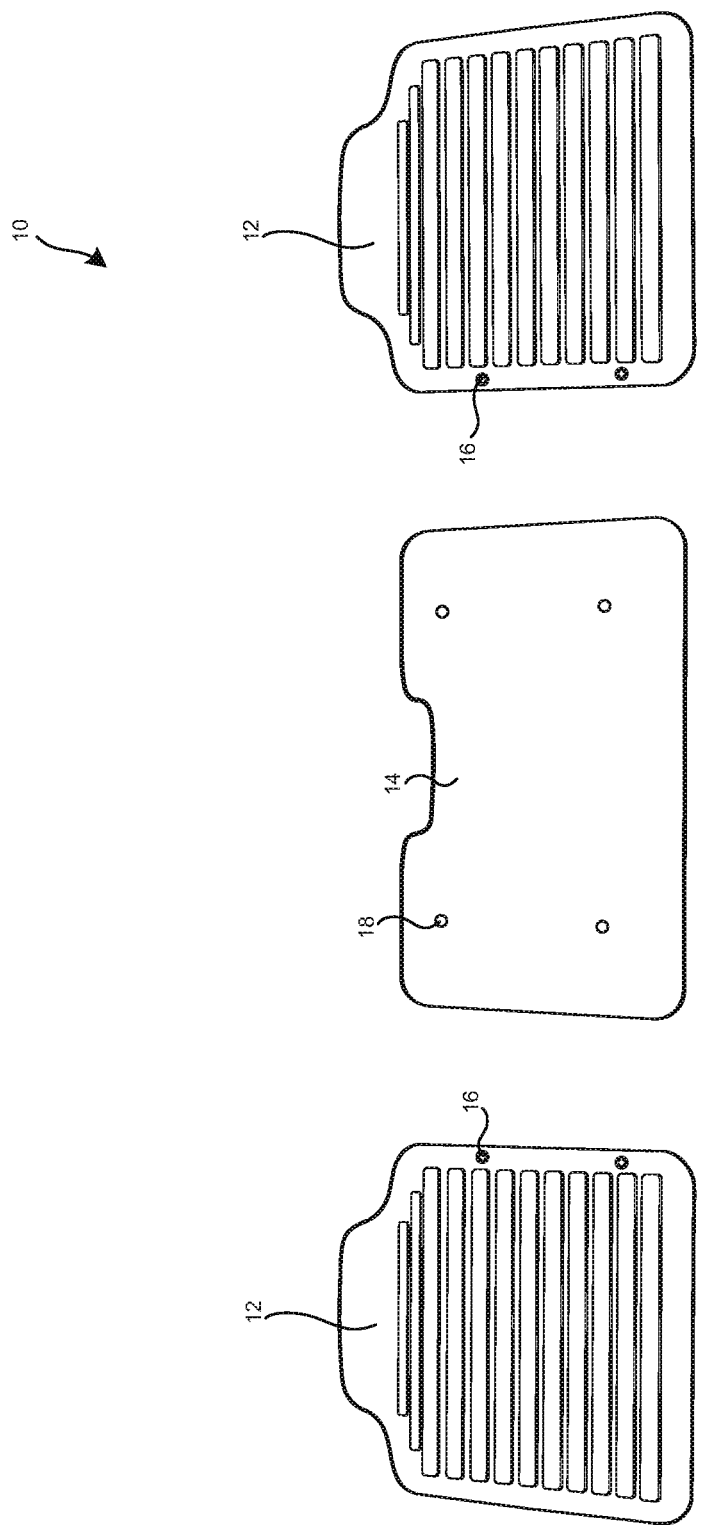
FIG. 1 represents a view of a car floor mat cover 10, in accordance with one embodiment of the present invention, which comprises a pair of mat sections 12 connectable by a connector section 14 displayed in a spaced apart manner.
Figure 2:
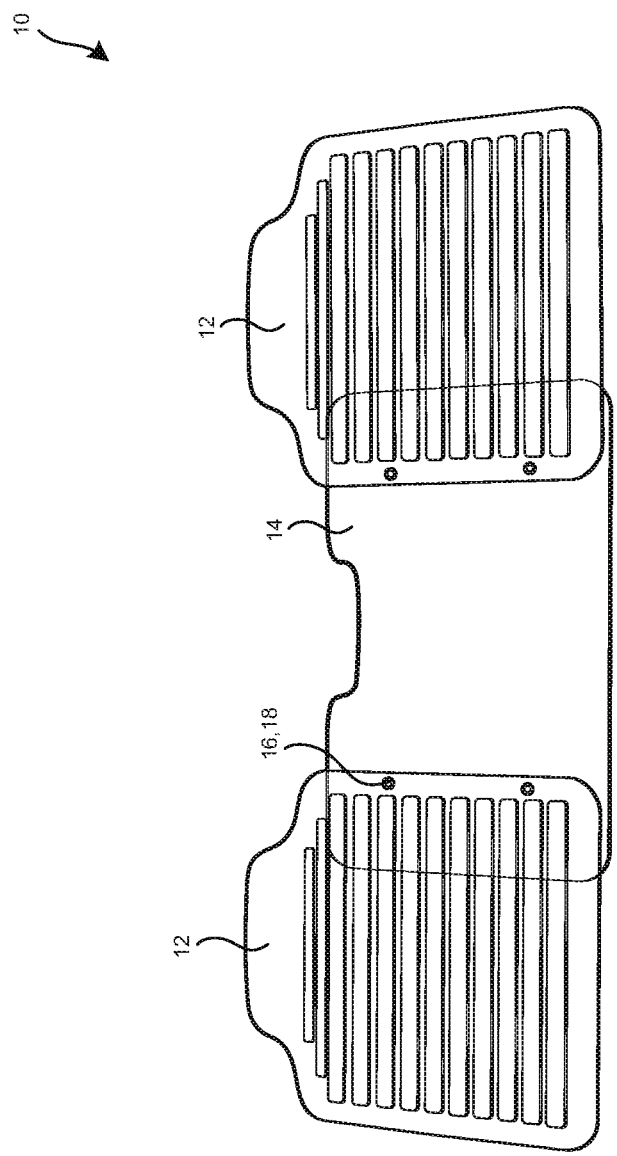
FIG. 2 demonstrates the assembled view of the present invention, wherein the pair of mat sections 12 and the connector section 14 are interconnected to form the car floor mat cover 10.

FIG. 1 represents a view of a car floor mat cover 10, in accordance with one embodiment of the present invention. FIG. 2 demonstrates the assembled view of the present invention. Referring now to FIGS. 1-2, where the present invention is generally referred to with numeral 10, it can be observed that the car floor mat cover 10 (interchangeably referred to as cover 10), in accordance with one embodiment, comprises a pair of mat sections 12 connectable by a connector section 14.

Each mat section 12 of the cover 10 is provided with connection formations 16, while the connector section 14 is provided with complementary connection formations 18. In one embodiment, the connection formation 16 can be a notch that is configured to be press-fitted into the complementary connection formation 18 that is a hole. Another embodiment of the cover 10 may involve the use of buckles as connection means for connecting the mat sections 12 with the connector section 14.

Figure 3:
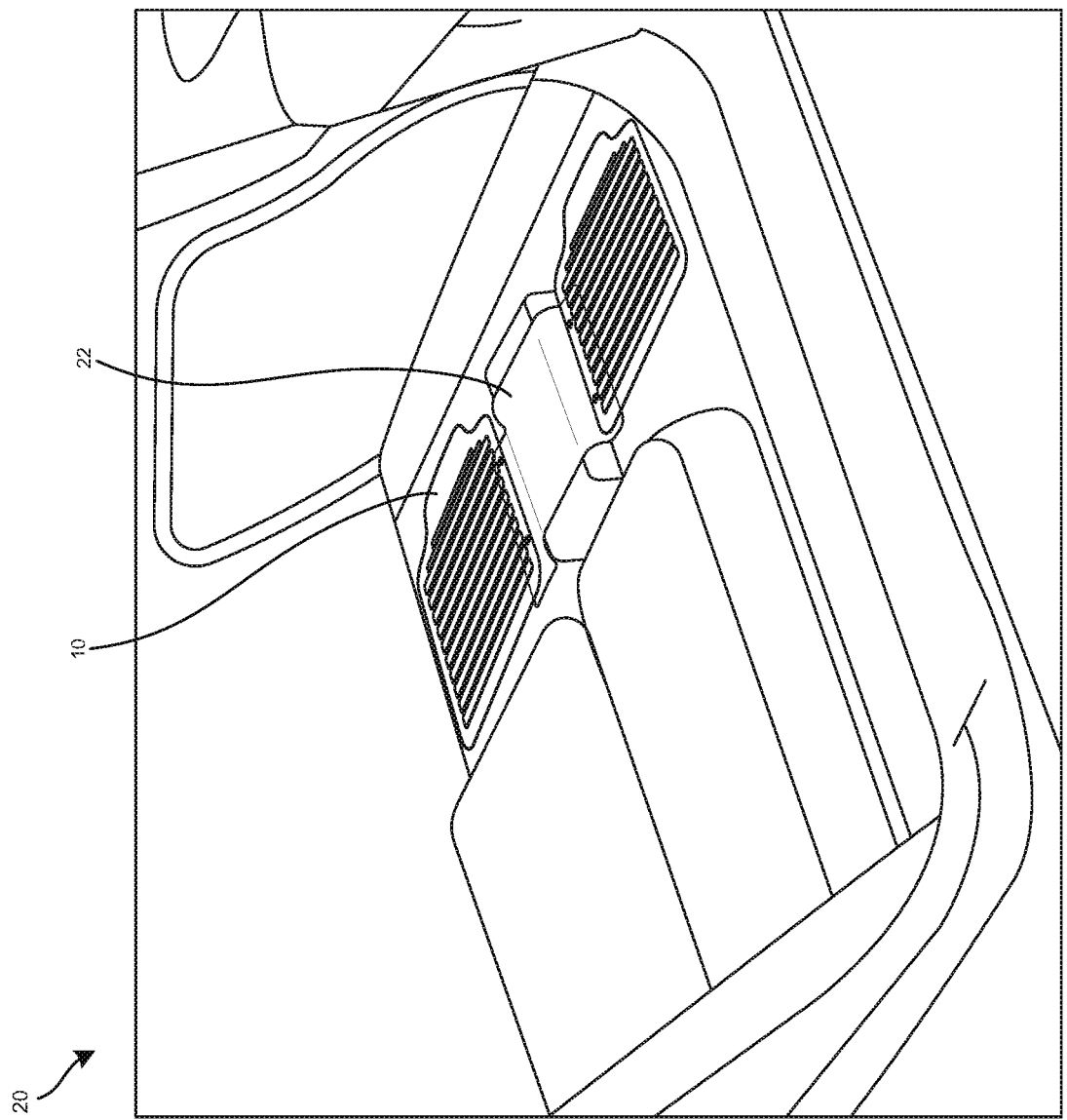
FIG. 3 demonstrates the working environment of the present invention, wherein the car floor mat cover 10 is used on a car floor having a raised portion.

FIG. 3 demonstrates the working environment of the present invention, wherein the car floor mat cover 10 is used on a car 20 floor having a raised portion 22. In most of the cars today, the floor in the back seat section of the car 20 is typically provided with a central reinforcing rib in the form of the raised portion 22. The conventional floor mats cover only the floor portion and typically fail to cover the raised portion 22. Due to this, the raised portion is prone to get dirty if the passengers do not take enough precautions before entering the car. However, the modular nature of the cover 10 allows the mat sections 12 to be connected by the connector section 14, which in turn forms the cover for the raised portion 22, thereby keeping the raised portion 22 clean.

Figure 4:
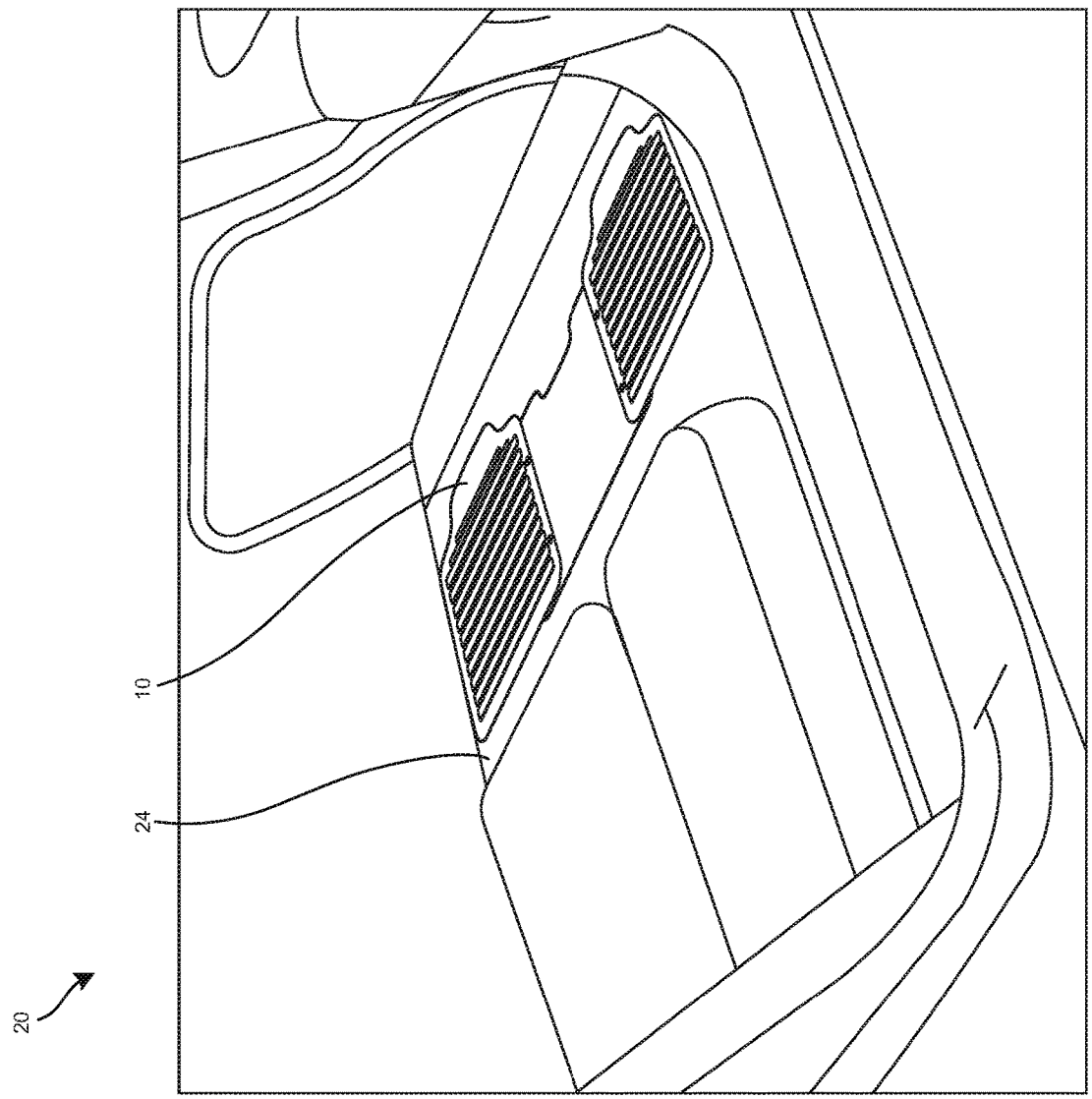
FIG. 4 demonstrates the working environment of the present invention, wherein the car floor mat cover 10 is used on a car floor having a flat configuration.

FIG. 4 demonstrates the working environment of the present invention, wherein the car floor mat cover 10 is used on a car floor 24 having a flat configuration. The application of the cover 10 is not to be limited to the car having raised portions on the floor of the back seat portion and can be used for car floors having a flat configuration too, as seen in FIG. 4.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A modular cover for a floor of a vehicle, the modular cover comprising:
   a. a plurality of mat sections; and
   b. at least one connection section for removably coupling the plurality mat sections to form a continuous cover, wherein the at least one connection section is removably connected to the plurality of mat sections via a press fit or a snap fit, said press fit or snap fit achieved via connection formations on each of said plurality of mat sections and complementary connection formations on each of said at least one connection section, said connection formations being evenly spaced apart on a same vertical plane of each of said plurality of mat sections, said connection formations corresponding and engaging said complementary connection formations, said connection formations extending a partial mat width, said complement connection formations extending a partial connection section width.

2. The modular cover as claimed in claim 1, wherein the connection formations is at least one selected from a group consisting of a notch and a hole.

3. The modular cover as claimed in claim 1, wherein the complementary connection formations is at least one selected from a group consisting of a notch and a hole.

4. The modular cover as claimed in claim 1, wherein each of said plurality of mat sections includes horizontal members mounted on a top side thereof.

5. The modular cover as claimed in claim 4, wherein said horizontal members extend a partial length of each of said plurality of mat sections.

6. The modular cover as claimed in claim 4, wherein said horizontal members on each of said plurality of mat sections are evenly spaced apart and parallel to each other.

7. The modular cover as claimed in claim 4, wherein said horizontal members are of different lengths and widths.

\* \* \* \* \*